United States Patent
Dietle et al.

(10) Patent No.: US 12,442,449 B2
(45) Date of Patent: Oct. 14, 2025

(54) BIDIRECTIONAL HYDRODYNAMIC ROTARY SEAL

(71) Applicant: KALSI ENGINEERING, INC., Sugar Land, TX (US)

(72) Inventors: Lannie Laroy Dietle, Arnold, MD (US); Aaron Paul Richie, Missouri City, TX (US)

(73) Assignee: KALSI ENGINEERING, INC., Sugar Land, TX (US)

( * ) Notice: Subject to any disclaimer, the term of this patent is extended or adjusted under 35 U.S.C. 154(b) by 0 days.

(21) Appl. No.: 18/597,455

(22) Filed: Mar. 6, 2024

(65) Prior Publication Data
US 2024/0301954 A1    Sep. 12, 2024

Related U.S. Application Data

(60) Provisional application No. 63/576,765, filed on Mar. 6, 2023.

(51) Int. Cl.
*F16J 15/3204* (2016.01)
*B29C 43/18* (2006.01)
*B29C 43/52* (2006.01)
*B29L 31/26* (2006.01)

(52) U.S. Cl.
CPC ......... *F16J 15/3204* (2013.01); *B29C 43/184* (2013.01); *B29C 43/52* (2013.01); *B29L 2031/26* (2013.01)

(58) Field of Classification Search
CPC .... F16J 15/3204; B29C 43/184; B29C 43/52; B29L 2031/26
See application file for complete search history.

(56) References Cited

U.S. PATENT DOCUMENTS

| | | |
|---|---|---|
| 4,484,753 A | 11/1984 | Kalsi |
| 6,007,105 A | 12/1999 | Dietle et al. |
| 6,334,619 B1 * | 1/2002 | Dietle ............... F16J 15/322 |
| | | 277/559 |

(Continued)

FOREIGN PATENT DOCUMENTS

EP        3635281 B1    2/2022

OTHER PUBLICATIONS

International Search Report and Written Opinion for PCT Application No. PCT/US2024/018688 dated Jul. 8, 2024.

*Primary Examiner* — Eugene G Byrd
(74) *Attorney, Agent, or Firm* — Bracewell LLP; Douglas W. Rommelmann

(57) ABSTRACT

A seal configuration, mold and manufacturing process that inhibits undesirable elastomer migration onto critical radially inwardly facing portions of a plastic-lined dynamic sealing lip, for improved high-pressure seal operation. The seal configuration is a hydrodynamically lubricating rotary seal for differential pressure acting in either axial direction that establishes compressed sealing engagement with a relatively rotatable surface and wedges a film of lubricating fluid into the interface between the rotary seal and the relatively rotatable surface in response to relative rotation that may occur in the clockwise or counter-clockwise direction. The rotary seal having a dynamic lip with hydrodynamic waves on both sides of the dynamic lip with the axial width of the seal minimized while maximizing the axial width of the dynamic sealing surface.

21 Claims, 11 Drawing Sheets

(56) References Cited

U.S. PATENT DOCUMENTS

| | | | |
|---|---|---|---|
| 8,056,904 B2 | 11/2011 | Dietle et al. | |
| 8,505,924 B2 * | 8/2013 | Dietle | F16J 15/008 |
| | | | 277/349 |
| 9,086,151 B2 | 7/2015 | Dietle et al. | |
| 9,121,503 B2 * | 9/2015 | Dietle | F16J 15/164 |
| 10,302,200 B2 | 5/2019 | Dietle | |
| 11,668,399 B2 * | 6/2023 | Dietle | B29C 43/18 |
| | | | 249/63 |
| 2006/0214380 A1 * | 9/2006 | Dietle | F16J 15/3244 |
| | | | 277/559 |
| 2010/0259015 A1 * | 10/2010 | Dietle | F16J 15/324 |
| | | | 277/559 |
| 2015/0316152 A1 | 11/2015 | Fietz et al. | |
| 2018/0335146 A1 * | 11/2018 | Dietle | F16J 15/3244 |
| 2019/0353252 A1 | 11/2019 | Dietle | |

* cited by examiner

BIDIRECTIONAL HYDRODYNAMIC ROTARY SEAL

CROSS-REFERENCE TO RELATED APPLICATIONS

This application claims the benefit of U.S. Provisional Application Ser. No. 63/576,765 filed on Mar. 6, 2023, by Lannie Laroy Dietle and Aaron Paul Richie, entitled "Bidirectional Hydrodynamic Rotary Seal and Method of Making Same." Applicant incorporates by reference herein Application Ser. No. 63/576,765 in its entirety.

BACKGROUND OF THE INVENTION

1. Field of the Invention

The present invention relates generally to rotary seals for establishing sealing between relatively rotatable machine components and separating a lubricant-type first fluid from a second fluid and a method of making the rotary seals. More particularly, the present invention relates to rotary seals wherein when the pressure of the first fluid exceeds the pressure of the second fluid, the geometry of the seal interacts with the first fluid during relative rotation to wedge a lubricating film of the first fluid into the dynamic sealing interface between the seal and a relatively rotatable surface, and when the pressure of the second fluid exceeds the pressure of the first fluid the geometry of the seal interacts with the second fluid during relative rotation to wedge a lubricating film of the second fluid into the dynamic sealing interface between the seal and the relatively rotatable surface.

2. Description of the Related Art

U.S. Pat. No. 7,562,878 for "Low Torque Hydrodynamic Lip Geometry for Bi-directional Rotation Seals," U.S. Pat. No. 8,056,904 for "Low Torque Hydrodynamic Lip Geometry for Bi-directional Rotation Seals," and U.S. Pat. No. 9,086,151 for "Low Torque Hydrodynamic Lip Geometry for Rotary Seals" describe a hydrodynamic seal with a generally circumferential dynamic lip comprising at least two hydrodynamic waves, at least a portion of the dynamic lip defining a dynamic surface adapted to form a sealing interface with the relatively rotatable surface, wherein at least one of the hydrodynamic waves comprises: a multi-function edge having a convex profile when viewed in longitudinal cross-section, the multi-function edge having first and second circumferentially spaced ends, the portion of the multi-function edge near the first circumferentially spaced end forming a ramp section, wherein at least a portion of the ramp section substantially level with the dynamic surface and at least a portion of the ramp section sloping away from the dynamic surface in the direction of the first circumferentially spaced end, a portion of the ramp section located nearest to the first circumferentially spaced end of the multi-function edge being closer to the static sealing surface compared to the second circumferentially spaced end of the multi-function edge; a dimple/recess including a dimple/recess flank having a generally convex curve profile when viewed in longitudinal cross-section, the dimple/recess being formed in part by the ramp section; and the dimple/recess including a dimple/recess fillet located between the ramp section and the dimple/recess flank when viewed in longitudinal cross-section, the dimple/recess fillet having a generally concave profile when viewed in longitudinal cross-section and having a sloping profile in the circumferential direction, the dimple/recess fillet being substantially tangent to the dimple/recess flank and the ramp section when viewed in longitudinal cross-section.

Unlike many hydrodynamic waves, these hydrodynamic waves can lubricate dynamic lips that are lined with a layer of plastic. U.S. Pat. Nos. 7,562,878, 8,056,904, and 9,086,151 are incorporated herein by reference for all purposes.

U.S. Pat. No. 10,302,200 for "Seal for Bi-directional Rotation and Pressure" is a modification of the seal described by U.S. Pat. Nos. 7,562,878, 8,056,904, and 9,086,151 where the multifunction edge and angled flank of the hydrodynamic wave form are truncated by the lubricant end of the seal, improving the dynamic performance of the seal in circumstances where the pressure acting on the environment end of the seal is greater than the pressure acting on the lubricant end of the seal. U.S. Pat. No. 10,302,200 is incorporated herein by reference for all purposes.

U.S. Pat. No. 11,668,399 for "Rotary Seal and Method of Making Same" describes a seal configuration, a mold, and a manufacturing process that inhibits undesirable elastomer migration onto critical radially inwardly facing portions of a plastic-lined dynamic sealing lip, for improved high-pressure seal operation. The described technology can be advantageously used to produce plastic lined versions of the seals described in U.S. Pat. Nos. 7,562,878, 8,056,904, 9,086,151, and 10,302,200. U.S. Pat. No. 11,668,399 is incorporated herein by reference for all purposes.

It is desirable to have an improved bidirectional hydrodynamic rotary seal and a method of making a bidirectional hydrodynamic rotary seal. It is further desirable to have a hydrodynamic rotary seal for bi-directional rotation and pressure. It is further desirable to have bidirectional rotation and pressure hydrodynamic rotary seal which minimizes the width of the rotary seal while providing the required sealing capabilities necessary for high pressure and high speed applications.

SUMMARY OF THE INVENTION

One aspect of the present invention relates generally to manufacturing annular polymeric seals for establishing sealing between a housing and a relatively rotatable surface of a shaft and separating a first fluid from a second fluid, where a dynamic sealing surface of a dynamic lip engages the relatively rotatable surface. The dynamic sealing surface may be provided by an inner surface of an annular plastic liner.

One aspect of the present invention relates generally to rotary seals for establishing sealing between relatively rotatable machine components and separating a lubricant-type first fluid from a second fluid and a method of making the rotary seals. In one aspect, the present invention relates to rotary seals wherein when the pressure of the first fluid exceeds the pressure of the second fluid the geometry of the seal interacts with the first fluid during relative rotation to wedge a lubricating film of the first fluid into the dynamic sealing interface between the seal and the relatively rotatable surface, and when the pressure of the second fluid exceeds the pressure of the first fluid the geometry of the seal interacts with the second fluid during relative rotation to wedge a lubricating film of the second fluid into the dynamic sealing interface between the seal and the relatively rotatable surface.

A method is provided for manufacturing such seals where a specially configured mold is used to produce a specially configured seal shape that is then machined to a final configuration, where the mold configuration and specially configured seal shape inhibit elastomer from migrating between the mold cavity and the plastic liner during molding, and the finished machined seal is compact and does not have undesirable elastomer migrated onto critical surfaces of the dynamic lip.

The rotary seal is preferably produced by the following method:

(a) providing a mold for producing an annular molded part, the mold comprising a mold core, a mold cap and a mold collar, wherein the mold core, mold cap and mold collar have surfaces defining a mold cavity comprising:

a lip forming surface of annular form adjoining an annular extension forming surface of the mold core, the lip forming surface and extension forming surface of the mold core facing in a generally radially outward direction and the lip forming surface radially recessed relative to the extension forming surface of the mold core;

the mold collar having an extension forming surface and the mold cap having an extension forming surface;

(b) providing a plastic liner of annular form having a liner inner surface;

(c) installing the plastic liner on the mold core and the mold collar, the liner inner surface facing generally radially inward toward and encircling the lip forming surface and at least a portion of the extension forming surface of the mold core;

(d) after installing the plastic liner on the mold core and mold collar, introducing an elastomer around the plastic liner;

(e) closing the mold and applying pressure and temperature to vulcanize the elastomer and remold the liner inner surface to the shape of the lip forming surface and produce an annular molded part comprising:

a body first end and a body second end facing in generally opposite, generally axial directions, the body first end facing generally away from the body second end;

a first axial extension of annular form shaped at least in part by the extension forming surface of the mold core and the mold collar, the first axial extension extending axially beyond the body first end;

a second axial extension of annular form shaped at least in part by the extension forming surface of the mold core and the mold cap, the second axial extension extending axially beyond the body second end;

the first and second axial extensions having an inward surface of annular form facing in a generally radially inward direction;

a dynamic lip of annular form projecting radially inward relative to the inward surface and having a dynamic sealing surface of annular form facing in a generally radially inward direction;

a dynamic lip of annular form shaped by the lip forming surface and projecting radially inward relative to the inward surface and having a dynamic sealing surface of annular form facing in a generally radially inward direction; and (f) removing at least a portion of the first and second axial extensions producing a seal first end facing in a generally axial direction away from the body second end and located in radially intermediate location to the dynamic sealing surface and the body first end, and producing a seal second end facing in a generally axial direction away from the body first end and located in radially intermediate location to the dynamic sealing surface and the body second end.

Another aspect of the present invention is an improved bidirectional hydrodynamic rotary seal which minimizes the width of the rotary seal while providing the required sealing capabilities necessary for high pressure and high speed applications.

Another aspect of the present invention is a hydrodynamic rotary seal for bi-directional rotation and pressure having hydrodynamic waves on both sides of a dynamic lip. Yet another aspect is minimizing the axial width of the rotary seal while still providing sealing capabilities necessary for high pressure and high speed applications by staggering or offsetting the hydrodynamic waves on the two sides of the dynamic lip.

BRIEF DESCRIPTION OF THE SEVERAL VIEWS OF THE DRAWINGS

The aspects, features, and advantages of the embodiments of the invention mentioned above are described in more detail by reference to the drawings, wherein like reference numerals represent like elements having the same basic function, in which.

DESCRIPTION OF THE PREFERRED EMBODIMENTS

It should be understood at the outset that although illustrative implementations of one or more embodiments are described below, the disclosed assemblies, systems and methods may be implemented using any number of techniques, whether currently known or not yet in existence. The disclosure should in no way be limited to the illustrative implementations, drawings, and techniques described below, but may be modified within the scope of the appended claims along with their full scope of equivalents.

The following brief definition of terms shall apply throughout the application:

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the field of the art;

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiment, or it may be excluded.

Embodiments of the invention will now be described with reference to the figures, in which like numerals reflect like elements throughout. The terminology used in the description presented herein is not intended to be interpreted in any restrictive or limited way, simply because it is being utilized in conjunction with the detailed description of certain specific embodiments of the invention. Furthermore, embodiments of the invention may include several novel features, no single one of which is solely responsible for its desirable attributes or which is essential to practicing the invention described herein.

Figure 1:
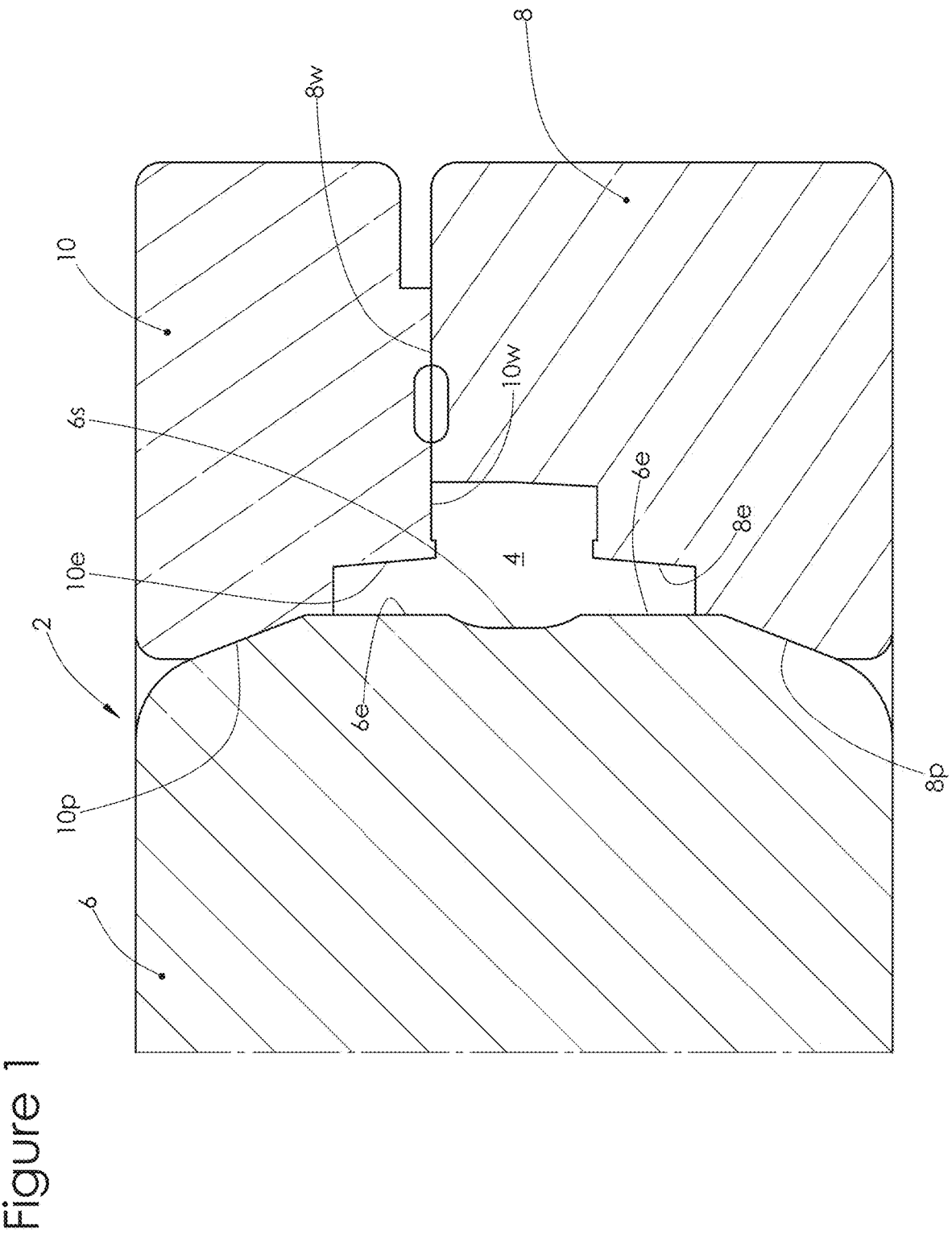
FIG. 1 is a fragmentary, longitudinal cross-sectional view of a mold for manufacturing a molded part according to a preferred embodiment of the present invention, the mold shown in a closed position.

Referring now to the fragmentary longitudinal cross-section of FIG. 1, a mold is shown generally at 2 in the closed position. Preferably, the mold 2 includes a mold core 6, a mold collar 8, and a mold cap 10, all being of annular form, and all sharing a same theoretical axis. The mold 2 defines a mold cavity 4. Preferably, the mold collar 8 and the mold cap 10 are axially separable from one another and separable from the mold core 6. The mold cavity 4 is formed in a shape that is appropriate for molding a rotary seal.

In a preferred embodiment as illustrated in FIG. 1, the mold cap 10 has a pilot surface 10$p$ that faces in a generally radially inward direction toward the mold core 6 and locates the mold cap 10 laterally with respect to the mold core 6. The mold cap 10 has a cap wall 10$w$ that faces in a generally axial direction and forms a part of the mold cavity 4. Preferably, a portion of the cap wall 10$w$ faces toward and abuts the mold collar 8 when the mold 2 is closed. The pilot surface 10$p$ and cap wall 10$w$ are preferably annular surfaces.

Preferably, the mold collar 8 has a collar end surface 8$w$ that faces in a generally axial direction toward and adjoins the cap wall 10$w$, locating the mold cap 10 axially when the mold 2 is closed. Preferably, the mold collar 8 has a pilot surface 8$p$ that faces in a generally radially inward direction toward the mold core 6 and locates the mold collar 8 laterally with respect to the mold core 6.

Figure 7:
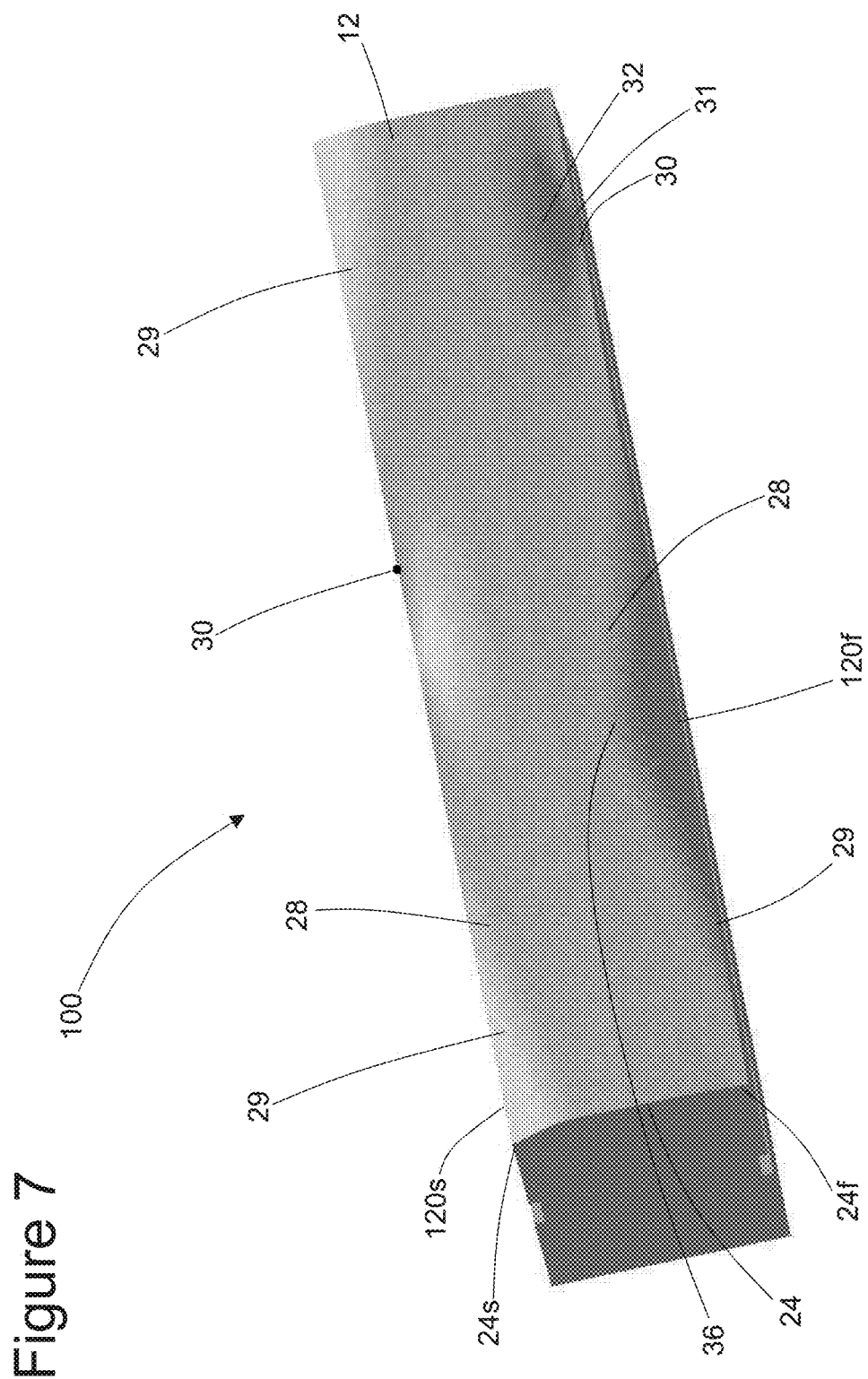
FIG. 7 is an enlarged fragmentary shaded perspective view showing the segment illustrated in FIG. 6 after removal of the side extensions to form the rotary seal.
Figure 8:
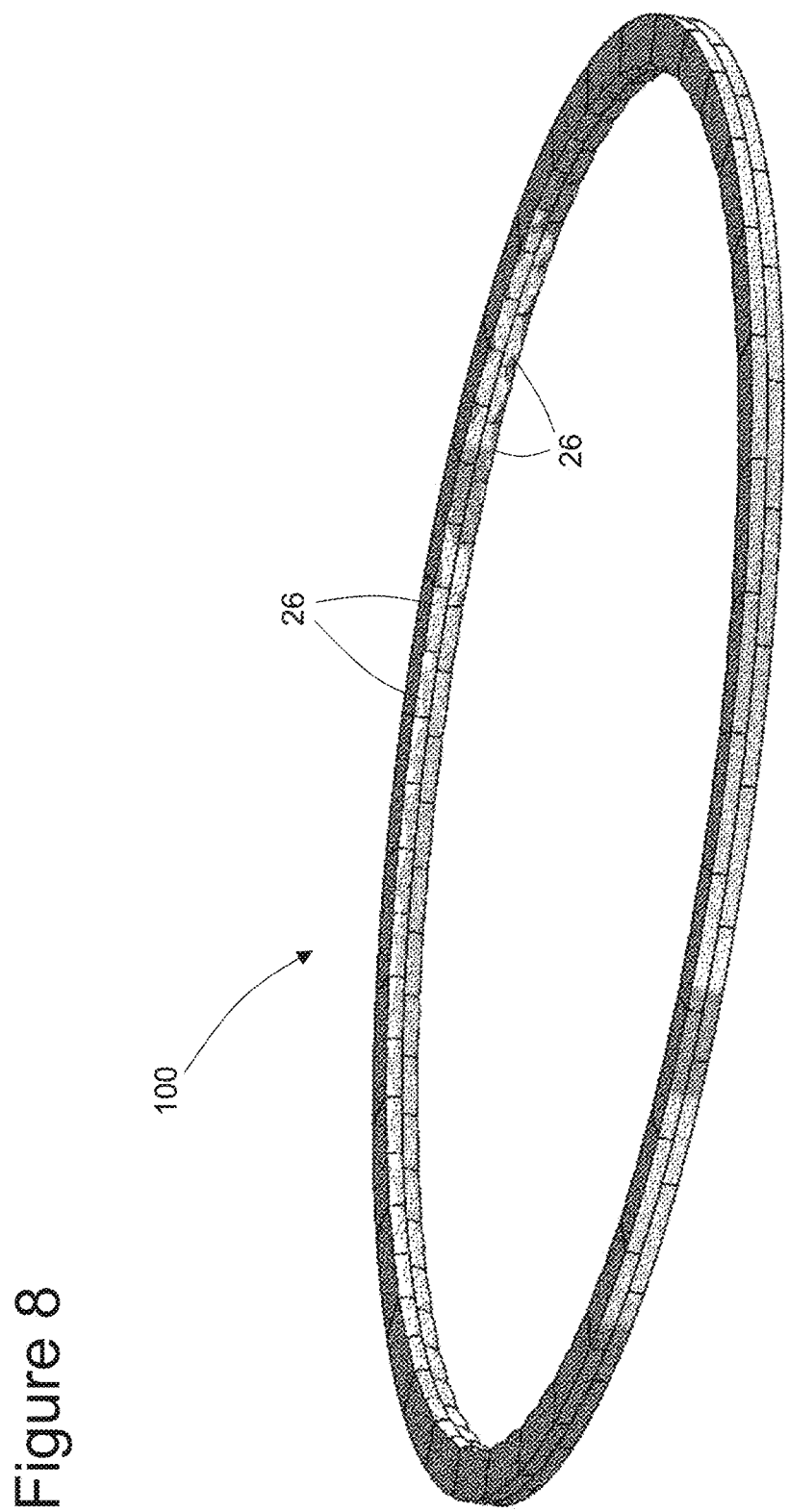
FIG. 8 is a shaded perspective view of a rotary seal, the rotary seal shown with solid lines between repetitive wave models offset around the circumference of the rotary seal.

Preferably, the mold core 6 incorporates a lip forming surface 6$s$ of annular form that faces in a generally radially outward direction and forms a part of the mold cavity 4. The lip forming surface 6$s$ is provided for forming a dynamic lip 24 (FIG. 5) of a rotary seal 100 (FIGS. 7 and 8). The lip forming surface 6$s$ is annular and a portion of the lip forming surface 6$s$ is convoluted and forms various features of the hydrodynamic waves 26 (FIG. 5) which are discussed below.

With reference to FIG. 1, the mold core 6, cap 10 and collar 8 each include an annular extension forming surface 6$e$, 10$e$, and 8$e$, respectively, forming part of the mold cavity 4.

Figure 2:
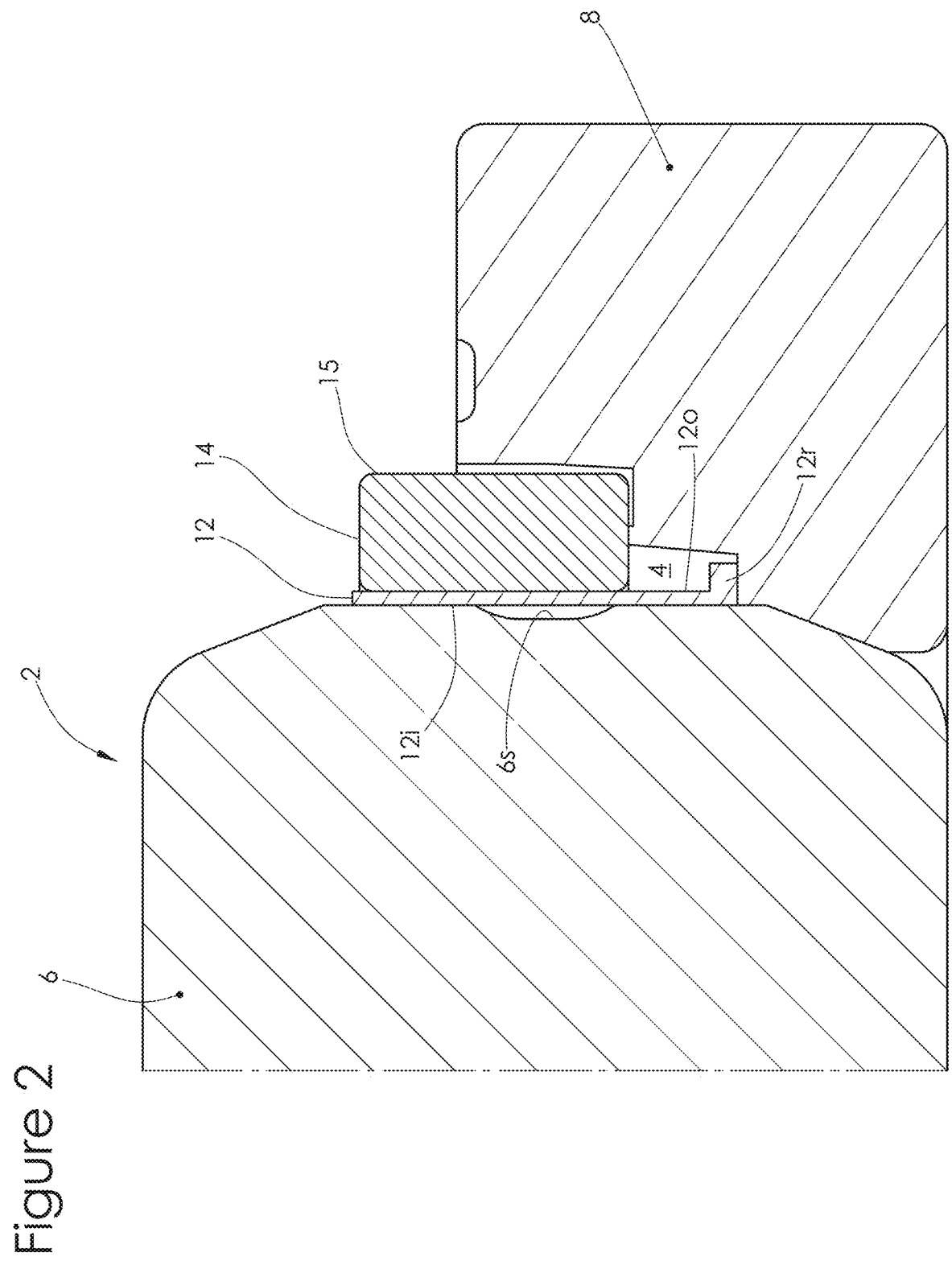
FIG. 2 is a fragmentary, longitudinal cross-sectional view of the mold shown in FIG. 1 with the mold in an open position and a liner and elastomer installed.

FIG. 2 shows the mold 2 with the cap 10 removed and an annular plastic liner 12 and elastomer 14 (unvulcanized) installed around the core 6 and preferably at least partially within the collar 8. The plastic liner 12 is preferably formed from and composed of a plastic material having desirable physical properties and dynamic running characteristics. The liner 12 has a liner inner surface 12$i$ of annular form that faces in a generally radially inward direction and a liner outer surface 12$o$ of annular form that faces in a generally radially outward direction, and in a direction generally opposite to the direction the liner inner surface 12$i$ faces. The liner 12 has a rim 12$r$ that projects radially outward, however simplifications are possible where the rim 12$r$ is omitted.

Preferably, in preparation for the molding operation, a suitable bonding agent is applied to the liner outer surface 12$o$. It is to be understood that the plastic liner 12 is optional, although desirable.

An appropriate molding process for forming the molded part 16 (FIG. 3) is compression molding. In compression molding, the mold collar 8 is installed onto the mold core 6. The elastomer 14, in the un-vulcanized condition, is prepared as a preform 15. The plastic liner 12 is placed in the open mold cavity 4 with the liner inner surface 12$i$ adjacent to the core 6 and the preform 15 adjacent to a portion of the liner outer surface 12$o$. The plastic liner 12 and preform 15 are arranged and positioned in the cavity in a manner so as to inhibit or entirely prevent the elastomer migrating between the plastic liner 12 and the mold core 6.

Figure 3:
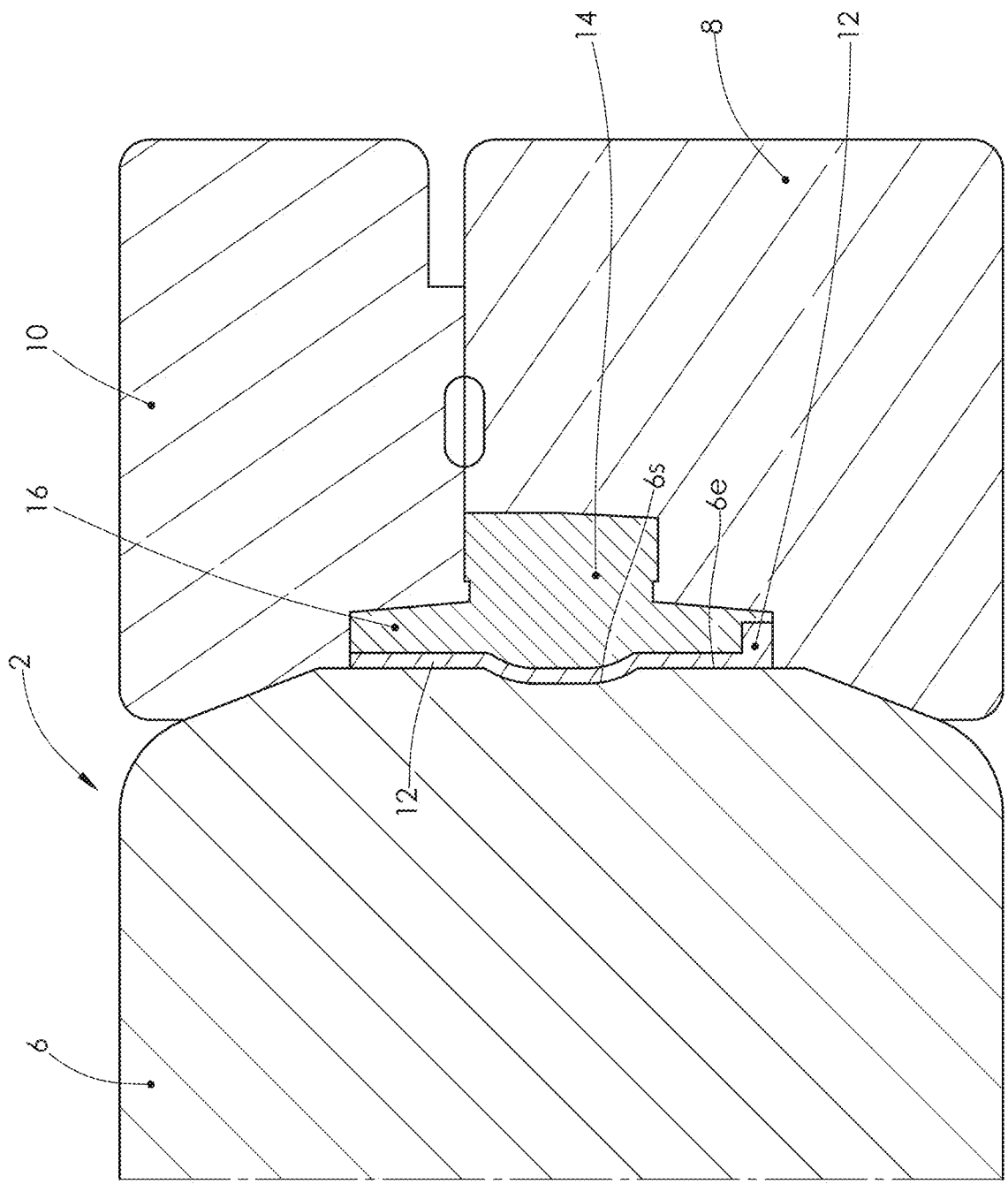
FIG. 3 is a fragmentary, longitudinal cross-sectional view of the mold in the closed position showing the process of molding a molded part having a liner.

The cap 10 is installed on top of the preform 15 and the mold 2 is inserted into a heated press that forces the mold cap 10 to a closed position. With reference to FIG. 3, the closing of the mold cap 10 and the thermal expansion of the elastomer 14 produce the necessary molding pressure to form the liner 12 to the shape of the cavity surfaces 6$e$, 6$s$ of the mold core 6. The heat and pressure cause the plastic liner 12 to conform to the shape of the core cavity surfaces 6$e$, 6$s$ and bond to the elastomer 14, and causes the elastomer 14 to vulcanize. The plastic liner 12 and vulcanized elastomer 14 together form a molded part 16 of annular form. The molded part 16 is molded to an axial length that is longer than the finished rotary seal (FIG. 7) and can be machined down to any desired axial length.

Figure 4:
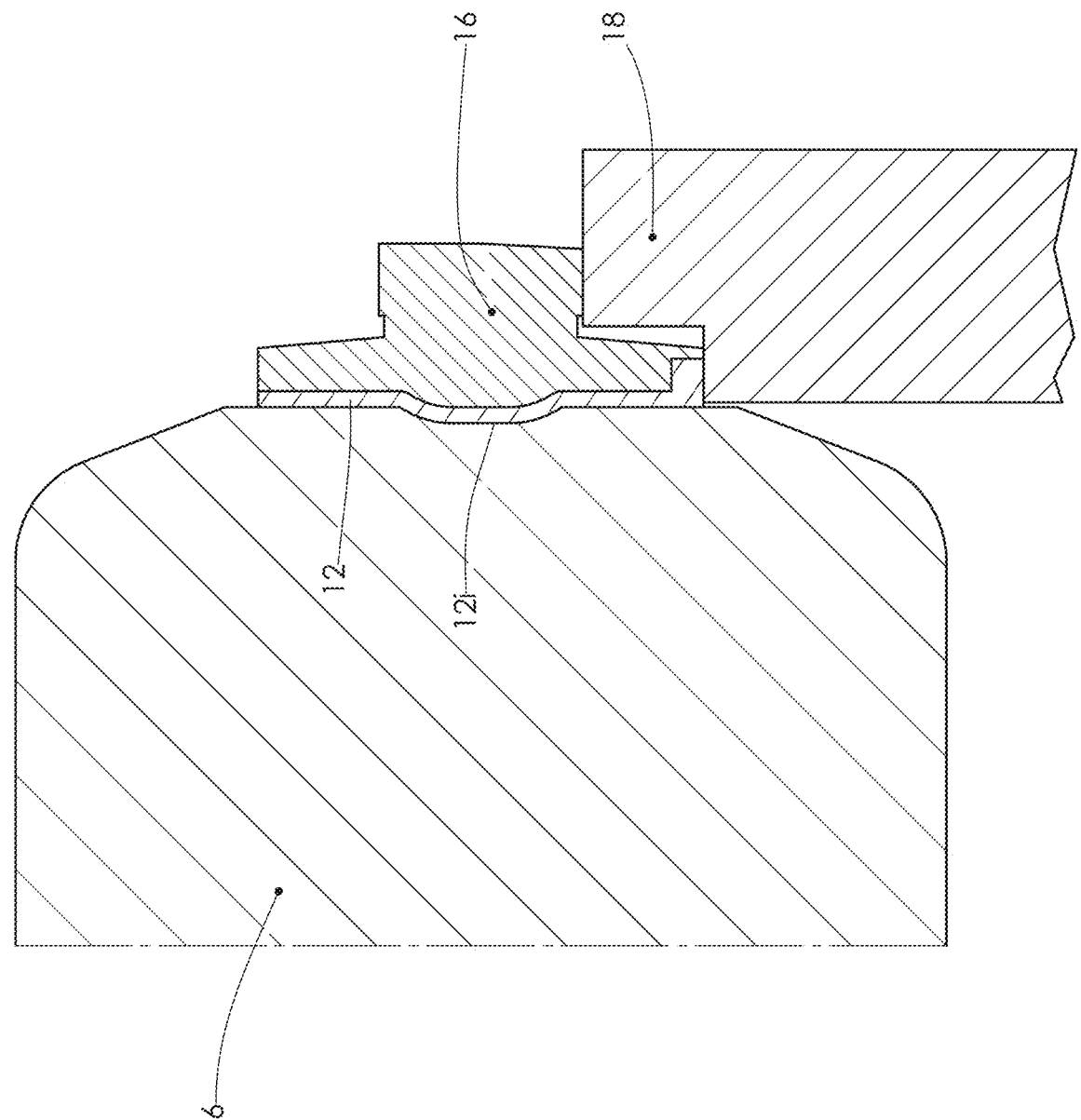
FIG. 4 is a fragmentary, longitudinal cross-sectional view of the mold with portions of the mold removed and a demolding ring assisting in removal of the molded part.

With reference to FIG. 4, the collar 8 and cap 10 have been removed from the core 6 leaving the molded part 16 lightly interlocked with the core 6. Preferably, a demolding ring 18 is used to push the molded part 16 off the core 6.

Figure 5:
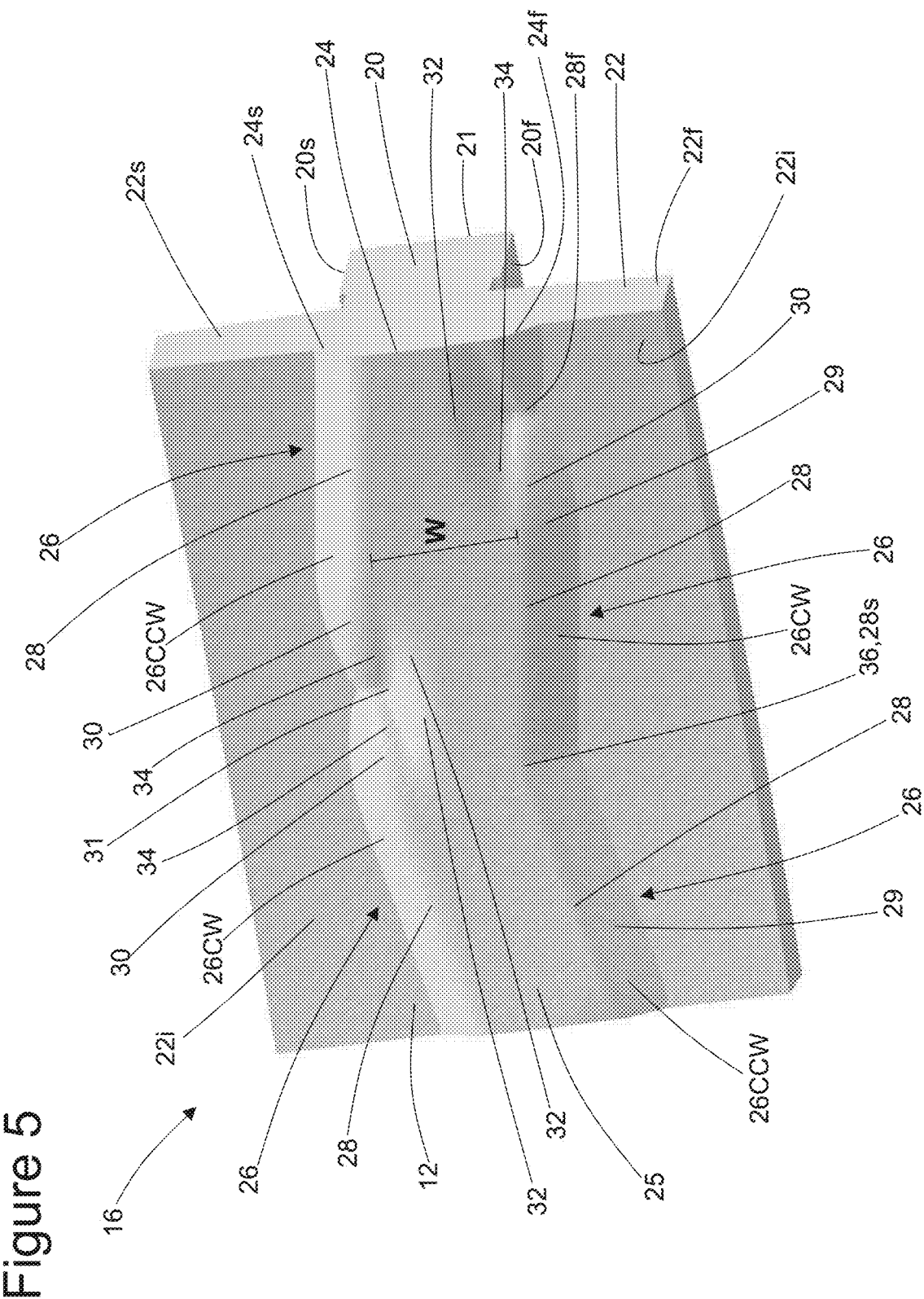
FIG. 5 is an enlarged fragmentary shaded perspective view showing a segment of the molded part, the segment illustrating one wave of a repetitive hydrodynamic wave pattern located on both sides of a dynamic lip.
Figure 6:
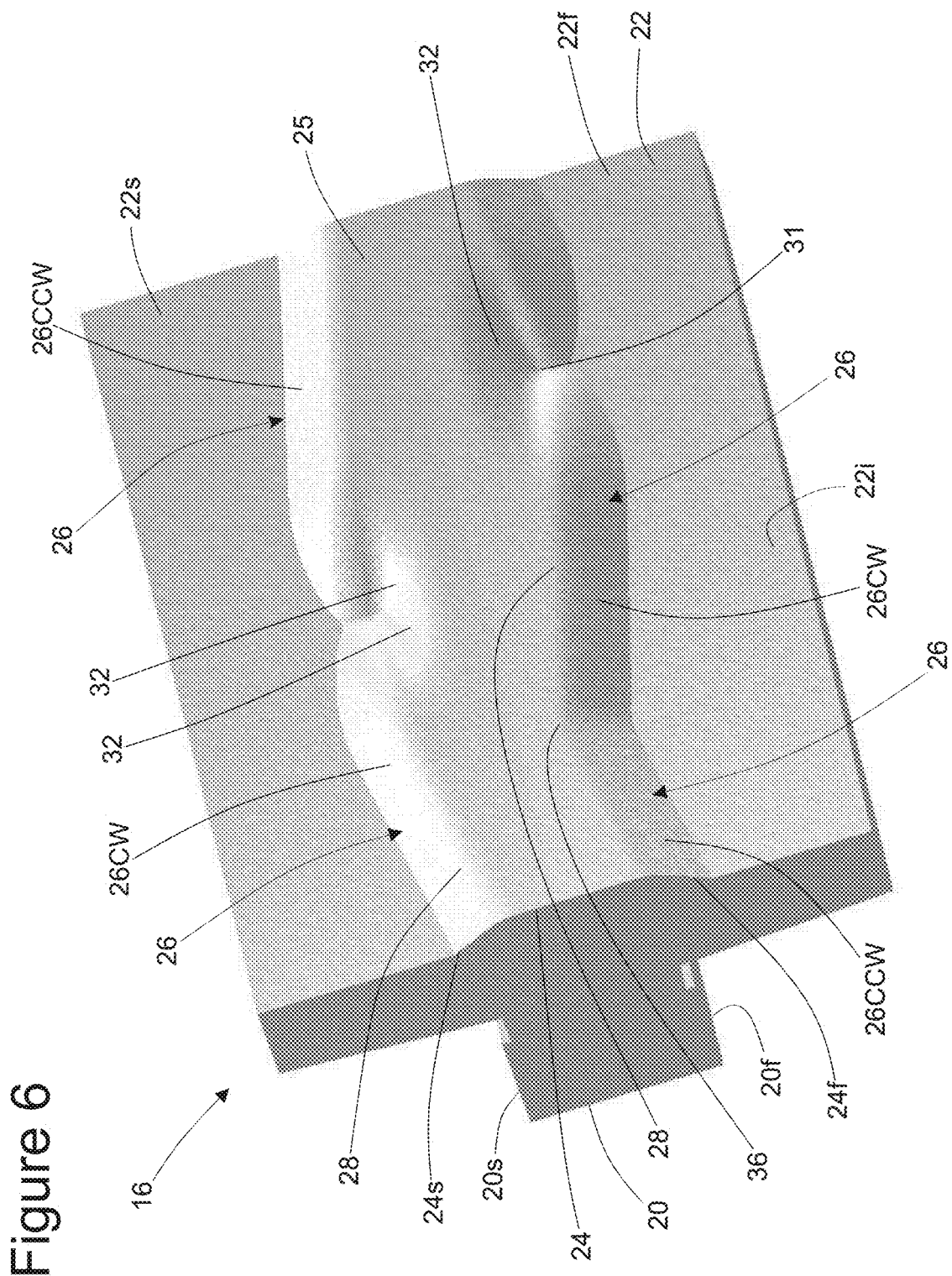
FIG. 6 is an enlarged fragmentary shaded perspective view showing the segment illustrated in FIG. 5 from a different perspective.

FIGS. 5 and 6 are enlarged fragmentary shaded perspective views, showing a segment of the same generally circular molded part 16. FIG. 6 is the same solid model as shown in FIG. 5, but is rotated differently to achieve different lighting effects and shadows, to assist the reader in understanding the shape of the hydrodynamic waves 26 described below. FIG. 7 shows the same fragment of the molded part 16 shown in FIGS. 5 and 6, but after a pair of extensions 22 have been removed, preferably by machining, from the molded part 16, thus forming the rotary seal 100.

FIG. 5 shows the molded part 16 having a body 20, the pair of extensions 22 (first extension 22*f* and second extension 22*s*) of annular form projecting from the body 20 in generally opposite directions, and a dynamic lip 24 that projects radially inward from the body 20 and extensions 22. The dynamic lip 24 defines a dynamic sealing surface 25 of generally cylindrical form. The dynamic sealing surface 25 is preferably part of the generally radially inward-facing surface 12*i* of the plastic liner 12. The dynamic sealing surface 25 forms the most radially inward surface of the dynamic lip 24. Preferably, the inner surface of the molded body 16 comprises the inner surface 12*i* of the plastic liner 12. The body 20 includes a body first end 20*f* and a body second end 20*s* facing in generally opposite, generally axial directions and separated by a distance, with the body first end 20*f* facing generally away from the body second end 20*s*. The body 20 also includes a static sealing surface 21 facing in a radially outward direction and adjoining the body first and second ends 20*f*, 20*s*. For purposes of describing the features of the illustrated embodiment, the molded part 16 is generally circular and the dynamic lip 24 faces radially inward. It is to be understood that the dynamic lip 24 could face other directions, as for example radially outward.

In the embodiment shown in FIG. 5, both sides of the dynamic lip 24 have hydrodynamic waves 26 of the general type taught by U.S. Pat. Nos. 7,562,878, 8,056,904, and 9,086,151. The segment illustrated in FIGS. 5 and 6 has substantially two hydrodynamic waves 26 on each side of the dynamic lip 24 with one wave being a clockwise wave and the other being a counter-clockwise wave on each side of the dynamic lip 24. In the following discussion, the abbreviation "CW" may be used to designate "clockwise," and the abbreviation "CCW" to designate "counter-clockwise." Although not required, CW waves 26CW are simply a mirror image of the CCW waves 26CCW. In one embodiment, the CW and CCW waves 26CW, 26CCW on each side of the dynamic lip 24 form a repetitive hydrodynamic wave pattern located on the inner periphery of the molded part 16 and the rotary seal 100. The complete rotary seal 100 incorporates a number of the described waves 26, with the number of waves 26 being selected based on the diameter of the seal 100. Typically, a seal 100 has an equal number of CW and CCW waves 26CW, 26CCW, but this is not a requirement. Configurations are possible where unequal numbers of CW and CCW waves 26CW, 26CCW are incorporated.

Each hydrodynamic wave 26 preferably incorporates a multi-function edge 28 having a first edge end 28*f* and a second edge end 28*s* and preferably extends for the full circumferential extent of the wave 26 as shown in FIG. 5. Preferably the angular location of the first edge end 28*f* coincides with the angular location of a first circumferential wave end and the angular location of the second edge end 28*s* coincides with the angular location of a second circumferential wave end of one wave 26. Preferably, the multi-function edge 28 is skewed with respect to the body end. As an example, for a wave 26 on the first side 24*f* of the dynamic lip 24, the second edge end 28*s* is farther from the body first end 20*f* (and a seal first end 120*f* (FIG. 7)) than the first edge end 28*f* is from the body first end 20*f* (and the seal first end 120*f* (FIG. 7)). Preferably, the multi-function edge 28 is convex and has a curved or curve-like profile when viewed in longitudinal cross-section. If desired, the hydrodynamic waves 26 may have angled flanks 29.

Preferably, the multi-function edge 28 of each hydrodynamic wave 26 has a ramp section 30 that curves away from, and radially outward of, the level of the dynamic sealing surface 25 and toward an extension 22. The portion of the ramp section 30 that is spaced the farthest away from the first edge end 28*f* is preferably even with (level with) the dynamic sealing surface 25 and the remainder of the ramp section 30 is preferably recessed relative to the level of the dynamic sealing surface 25. Preferably, the ramp section 30 of the multi-function edge 28 of a wave 26 near the body first end 20*f* (and near a seal first end 120*f* (FIG. 7)) is more axially distant from the body second end 20*s* (and a seal second end 120*s* (FIG. 7)), compared to the remaining portion of the multi-function edge 28. It is to be understood that if the waves 26 on both sides of the dynamic lip 24 are the same that the same principles apply. In other words, the ramp section 30 of the multi-function edge 28 of a wave 26 near the body second end 20*s* (and near the seal second end 120*s* (FIG. 7)) is more axially distant from the body first end 20*f* (and the seal first end 120*f* (FIG. 7)), compared to the remaining portion of the multi-function edge 28.

Preferably, each hydrodynamic wave 26 has a mouth 31 formed in part by the ramp section 30 and in part by the mouth flank 32. Preferably, the mouth flank 32 forms part of a side of the mouth 31 of a wave 26 near the body first end 20*f* (and near the seal first end 120*f* (FIG. 7)) that is nearer to the body second end 20*s* (and seal second end 120*s* (FIG. 7)), and the ramp section 30 forms a part of a side of the mouth 31 that is farther from the body second end 20*s* (and seal second end 120*s* (FIG. 7)). Likewise, preferably the mouth flank 32 forms part of the side of the mouth 31 of a wave 26 near the body second end 20*s* (and near the seal second end 120*s* (FIG. 7)) that is nearer to the body first end 20*f* (and seal first end 120*f* (FIG. 7)), and the ramp section 30 forms a part of a side of the mouth 31 that is farther from the body first end 20*f* (and seal first end 120*f* (FIG. 7)). Preferably, the mouth flank 32 is generally convex when viewed in longitudinal cross-section, and gradually increases from a finite curvature to an approximation of an infinite curvature (approximation of a straight line) causing the mouth flank 32 to gradually transform into and blend into the dynamic sealing surface 25.

Figure 10:
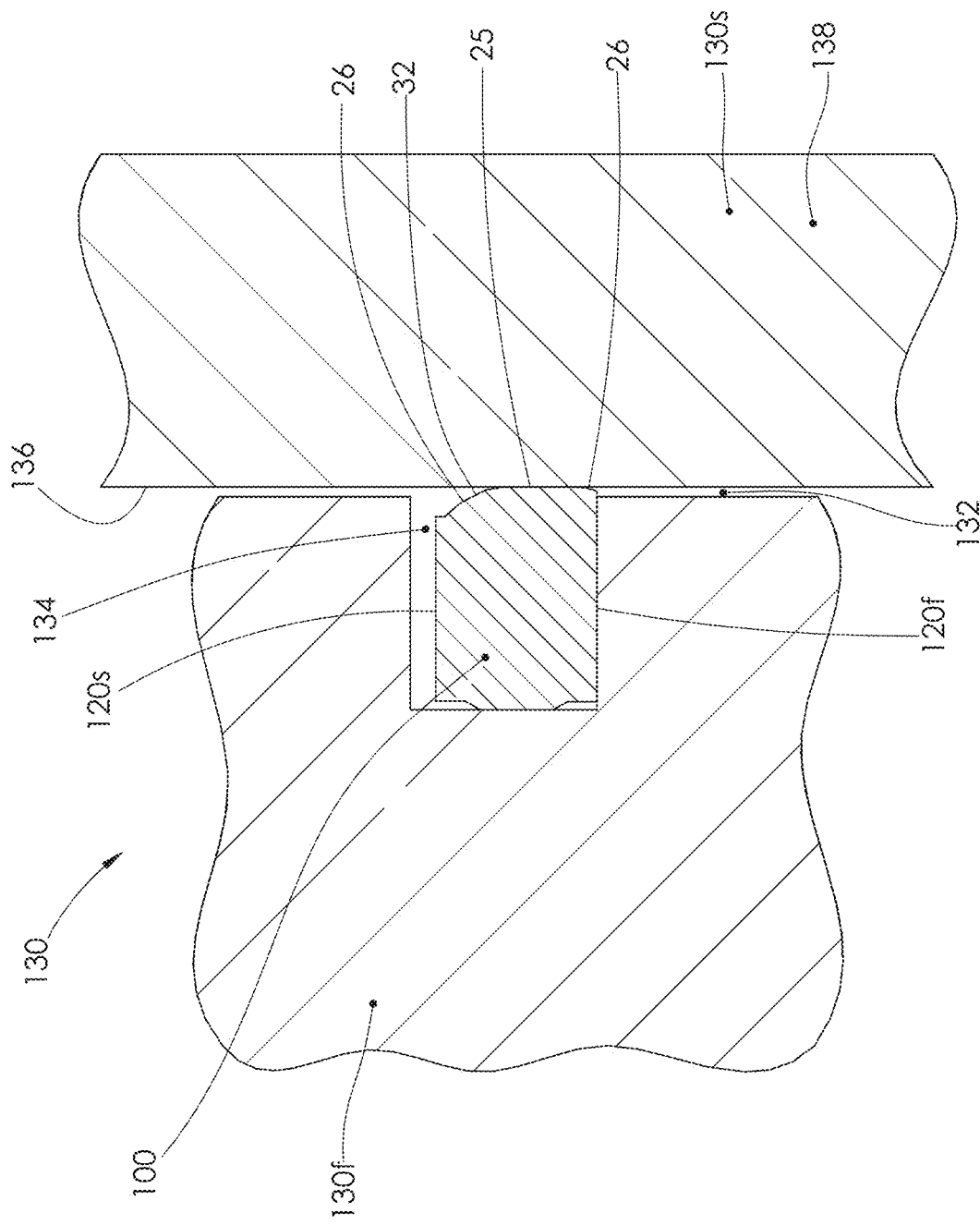
FIG. 10 is an enlarged fragmentary longitudinal cross-sectional view of a machine assembly in an operating condition where a second fluid pressure acting on a second end of the rotary seal is greater than a first fluid pressure acting on a first end of the rotary seal.

During periods of relative rotation, the mouth flank 32 and the ramp section 30 form at least part of a hydrodynamic inlet for providing lubricant within the interface between the rotary seal 100 and a relatively rotatable surface 136 (FIG. 10). The ramp section 30 is part of what controls the circumferential convergence of the mouth with the relatively rotatable surface 136.

Preferably, the mouth 31 has a mouth fillet 34 that is located generally axially between the mouth flank 32 and the ramp section 30. Preferably, each mouth fillet 34 gradually increases from a finite curvature to an approximation of an infinite curvature (approximation of a straight line) causing the mouth fillet 34 to gradually transform into and blend into the dynamic sealing surface 25.

Preferably, the mouth flanks 32 of adjacent waves 26 on a given side of the dynamic lip 24 meet at the location where the curvature of each mouth flank 32 is tightest. In other words, at a location having the most narrow or strongly-angled bend. Preferably, the multi-function edges 28 of adjacent hydrodynamic waves 26 on a given side of the dynamic lip 24 meet to form a trailing edge low point 36.

The dynamic sealing surface 25 has an axial width W (FIG. 5) which is not constant along the circumference of the dynamic sealing surface 25, but instead varies. As an example, based upon the wave geometry shown in FIGS. 5-7 and described herein, the mouth 31 and the skewed multi-function edge 28 of each wave 26 on opposite sides of the dynamic lip 24 may result in nonuniform and significant variations of the axial width W along the circumference of the dynamic sealing surface 25. A certain axial width of the dynamic sealing surface 25 is desirable and/or necessary to allow the dynamic sealing surface 25 to establish sealing with the mating surface, as for example a shaft 138 (FIG. 10). In other words, the axial width of the dynamic sealing surface should be at least a required minimum length at any point around the perimeter of the seal 100. Preferably, the seal 100 is as narrow axially as possible while still providing sealing capabilities necessary for high pressure and high speed applications. In the present invention this is accomplished by staggering or offsetting the waves 26 on the two sides of the dynamic lip 24 to minimize the axial width of the seal 100, while maintaining the required dynamic lip sealing surface width W necessary for the seal application.

Preferably, to preserve the necessary axial width of the dynamic sealing surface 25 while minimizing the axial width of the body 20, the mouth flanks 32 on one side of the dynamic lip 24 are not angularly aligned (i.e., not axially aligned) with the mouth flanks 32 on the other side of the dynamic lip 24. To preserve the necessary axial width of the dynamic sealing surface 25 while minimizing the axial width of the body 20, preferably the trailing edge low points 36 on one side of the dynamic lip 24 are not angularly aligned with the trailing edge low points 36 on the other side of the dynamic lip 24. In other words, preferably the trailing edge low points 36 on one side of the dynamic lip 24 are staggered from and circumferentially spaced from the trailing edge low points 36 on the other side of the dynamic lip 24.

Referring to FIG. 5, preferably the portion of a hydrodynamic wave 26 on one side of the dynamic lip 24 is misaligned enough with the hydrodynamic wave 26 on the other side of the dynamic lip 24 such that the trailing edge low points 36 on one side of the dynamic lip 24 are not aligned with the portions of the mouth flanks 32 on the other side of the dynamic lip 24 where the curvature of the mouth flanks 32 is less than an approximation of infinity. "An approximation of infinity" means that the radius is so large that over the axial length involved it is about the same as a straight line for all practical purposes. Alternatively, preferably the portion of a hydrodynamic wave 26 on one side of the dynamic lip 24 is misaligned with the hydrodynamic wave 26 on the other side of the dynamic lip 24 such that the trailing edge low points 36 on one side of the dynamic lip 24 are not aligned with the portions of the mouth flanks 32 on the other side of the dynamic lip 24 where the mouth flanks 32 have a curvature. In general, this means that to the extent possible the ramp sections 30 on one side of the dynamic lip 24 are not axially aligned with the ramp sections 30 on the other side of the dynamic lip 24 and are not aligned with the trailing edge low points 36 on the other side of the dynamic lip 24. In one aspect, the trailing edge low point 36 on one side of the dynamic lip 24 aligns with the portion of the mouth flank 32 that is tangent with the dynamic sealing surface on the other side of the dynamic lip 24. In one aspect, preferably the portion of a hydrodynamic wave 26 on one side of the dynamic lip 24 is misaligned enough with the hydrodynamic wave 26 on the other side of the dynamic lip 24 such that each trailing edge low point 36 on one side of the dynamic lip 24 is offset from the mouth 31 of the wave 26 on the other side of the dynamic lip 24 to maximize sealing width W. In one aspect, this occurs proximate to the location where the mouth flank 32 becomes recessed relative to the dynamic sealing surface 25.

The extensions 22 have the same purpose as those shown in U.S. Pat. No. 11,668,399 for "Rotary Seal and Method of Making Same." They inhibit undesirable elastomer migration onto critical radially inwardly facing portions of the plastic-lined dynamic sealing lip 24. As with the seals described in U.S. Pat. No. 11,668,399, the extensions 22 are preferably machined away after molding. Similar to the teachings of U.S. Pat. No. 10,302,200, after the machining process the multi-function edges 28 and angled flanks 29 of the hydrodynamic waves 26 are or may be truncated by the seal first and second ends 120$f$, 120$s$ (FIG. 7). This provides a wave form that can resist pressure-induced deformation when located on the low pressure side of the rotary seal 100, as taught by U.S. Pat. No. 10,302,200.

FIG. 7 shows a seal fragment of the same molded part fragment shown in FIGS. 5 and 6. As described above, FIG. 7 shows the rotary seal 100 after at least portions of the first and second extensions 22$f$, 22$s$ have been removed, preferably by machining. Preferably, the removal of at least portions of the first and second extensions 22$f$, 22$s$ truncates a portion of the dynamic lip 24. With reference to FIG. 7, preferably the seal first end 120$f$ is adjacent to, truncates, and forms an inner body corner with the angled flanks 29 and the ramp sections 30 on a first side 24$f$ of the dynamic lip 24, per the teachings of U.S. Pat. No. 10,302,200. Similarly, the seal second end 120$s$ preferably is adjacent to, truncates, and forms an inner body corner with the angled flanks 29 and the ramp sections 30 on a second side 24$s$ of the dynamic lip 24. Preferably, the liner 12 extends from the seal first end 120$f$ to the seal second end 120$s$. Preferably, at least a portion of the seal first and second ends 120$f$, 120$s$ is formed by the plastic liner 12.

Preferably, the body first and second ends 20$f$, 20$s$ and seal first and second ends 120$f$, 120$s$ are generally planar surfaces. Preferably, the seal first end 120$f$ is a substantially planar surface that is substantially level or even with the body first end 20$f$. Preferably, the seal second end 120$s$ is a substantially planar surface that is substantially level or even with the body second end 20$s$. Preferably, the seal first end 120$f$ is separated from the body second end 20$s$ by a distance, and the distance separating the seal first end 120$f$ from the body second end 20$s$ is substantially the same as the distance separating the body first end 20$f$ from the body second end 20$s$. Preferably, the seal second end 120$s$ is separated from the body first end 20$f$ by a distance, and the distance separating the seal second end 120$s$ from the body first end 20$f$ is substantially the same as the distance separating the body second end 20$s$ from the body first end 20$f$. Preferably, the seal first end 120$f$ is separated from the seal second end 120$s$ by a distance, and the distance separating the seal first end 120$f$ from the seal second end 120$s$ is substantially the same as the distance separating the body first end 20$f$ from the body second end 20$s$.

Figure 9:
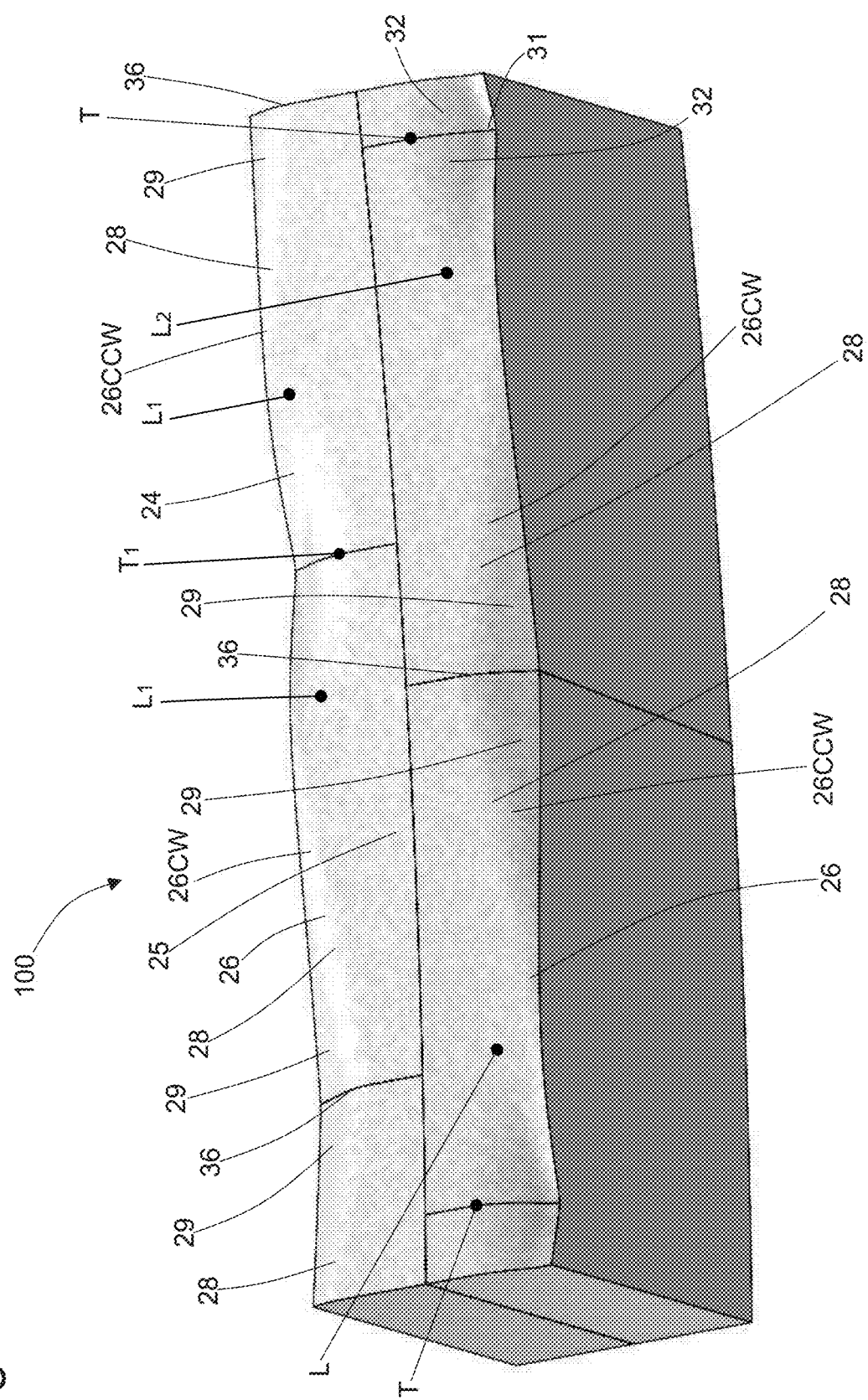
FIG. 9 is an enlarged fragmentary shaded perspective view of the rotary seal showing the misalignment between the hydrodynamic waves on the opposite sides of the seal around the inner periphery of the rotary seal.

FIG. 8 shows a version of a preferred embodiment of the rotary seal 100 of the present invention and FIG. 9 is an enlargement of the rotary seal 100 shown in FIG. 8. Referring to FIG. 8, the rotary seals 100 of the present invention form a continuous generally circular ring. Although not required, in a preferred embodiment the rotary seals 100 are comprised of repetitive solid models. Merely for illustrative purposes, lines are shown in FIG. 8 depicting the repetitive solid models used to form the entire rotary seal 100. Preferably, the hydrodynamic waves 26 on one side of the dynamic lip 24 are misaligned with the hydrodynamic waves 26 on the other side by a preferred amount to maximize the axial width W (FIG. 5) of the dynamic sealing surface 25 while minimizing the axial width of the seal.

FIG. 9 illustrates the degree of angular/circumferential misalignment between the hydrodynamic waves 26 on opposite sides of the rotary seal 100. The dynamic sealing surface 25, multi-function edge 28, angled flanks 29, and trailing edge low points 36 are labeled for orientation purposes. The letters "L" and "T" are used to represent variations in the curvature of the mouth flank 32, with "T" being the tightest curvature, and "L" being an approximation of infinity—meaning that the radius is so large that over the axial length involved it is about the same as a straight line for all practical purposes. In other words, "L" is the general vicinity where the mouth flank 32 merges into the dynamic sealing surface 25. Preferably, the "T" locations on one side of the dynamic lip 24 are circumferentially between the "L" locations and the trailing edge low points 36 on the other side of the dynamic lip 24, as shown. For example and referring to FIG. 9, the "$T_1$" location on one side of the dynamic lip 24 ($T_1$ is the tightest curvature of the mouth flank of CW and CCW waves 26CW, 26CCW) is circumferentially between the "$L_2$" location ($L_2$ is the loosest curvature of mouth flank of opposite side CW wave 26CW) and the trailing edge low point 36 on the other side of the dynamic lip 24. As shown, preferably the L-T-L portions of one side of the rotary seal 100 do not overlap circumferentially with the L-T-L locations on the opposite side of the rotary seal 100. Still referring to FIG. 9, preferably the L-T-L portions of one side of the seal 100 are located circumferentially between the "L" locations and the trailing edge low points 36 on the other side of the seal. See, for example, $L_1$-$T_1$-$L_1$ and $L_2$ and 36 in FIG. 9.

The described circumferential relationships between the hydrodynamic waves 26 on opposite sides of the seal 100 helps to maximize the axial width W of the dynamic sealing surface while minimizing the overall axial width of the rotary seal 100. If the circumferential length of the L-T-L portions on one side of the seal 100 is longer than the circumferential length between the "L" locations and the trailing edge low points 36 on the other side of the seal, then the L-T-L portions on one side of the seal should preferably straddle the circumferential length between the "L" locations and the trailing edge low points 36 on the other side of the seal, so that any circumferential overlap between the L-T-L portions on one side of the seal with the L-T-L portions on the other side of the seal is minimal. Preferably the trailing edge low points 36 on one side of the seal are not circumferentially aligned with the L-T-L portions on the other side of the seal.

FIG. 10 is a fragmentary longitudinal cross-sectional view of a machine assembly, shown generally at 130, having first and second machine components 130*f* and 130*s*, respectively. FIG. 10 provides a general overview of how the preferred embodiment of the present invention is employed when assembled into the machine assembly 130. The rotary seal 100 of generally circular, ring-shaped configuration establishes sealing engagement with a relatively rotatable surface 136, for example a shaft 138, and is designed for both static and dynamic sealing engagement with the relatively rotatable surface 136. The first end 120*f* of the rotary seal 100 may be exposed to a first fluid 132 and the second end 120*s* of the rotary seal to a second fluid 134. In one aspect of the invention the first fluid 132 and the second fluid 134 are lubricants. In one aspect of the invention, the first and second fluids 132, 134 are the same lubricant.

As shown in FIG. 10, the rotary seal 100 includes hydrodynamic waves 26 on both sides of the seal which are separated by the dynamic sealing surface 25. The seal geometry (i.e., hydrodynamic waves 26) of the rotary seal 100 interacts with the first and second fluids 132, 134 to distribute a lubricant film within the dynamic sealing interface formed between the dynamic sealing surface 25 and the relatively rotatable surface 136. During periods of relative rotation with the shaft 138, the hydrodynamic waves 26 on both sides of the rotary seal 100 pump a lubricant film into the dynamic sealing interface between the seal 100 and the shaft 138, reducing friction, heat, and wear.

FIG. 10 shows an operating condition where the second fluid 134 pressure acting on the second end 120*s* of the rotary seal 100 is greater than the first fluid 132 pressure acting on the first end 120*f* of the rotary seal 100. If the hydrodynamic waves 26 are the same on both sides of the bi-directional rotation and pressure seal 100, the hydrodynamic pumping action will go from the high pressure side to the low pressure side. However, if the hydrodynamic waves 26 on each side of the seal 100 are different, the leakage can be biased in one direction even if from the low pressure side. For example, if the hydrodynamic waves 26 on one side of the seal are more aggressive waves than on the other side of the seal, leakage of fluid may only go in one axial direction.

Figure 11:
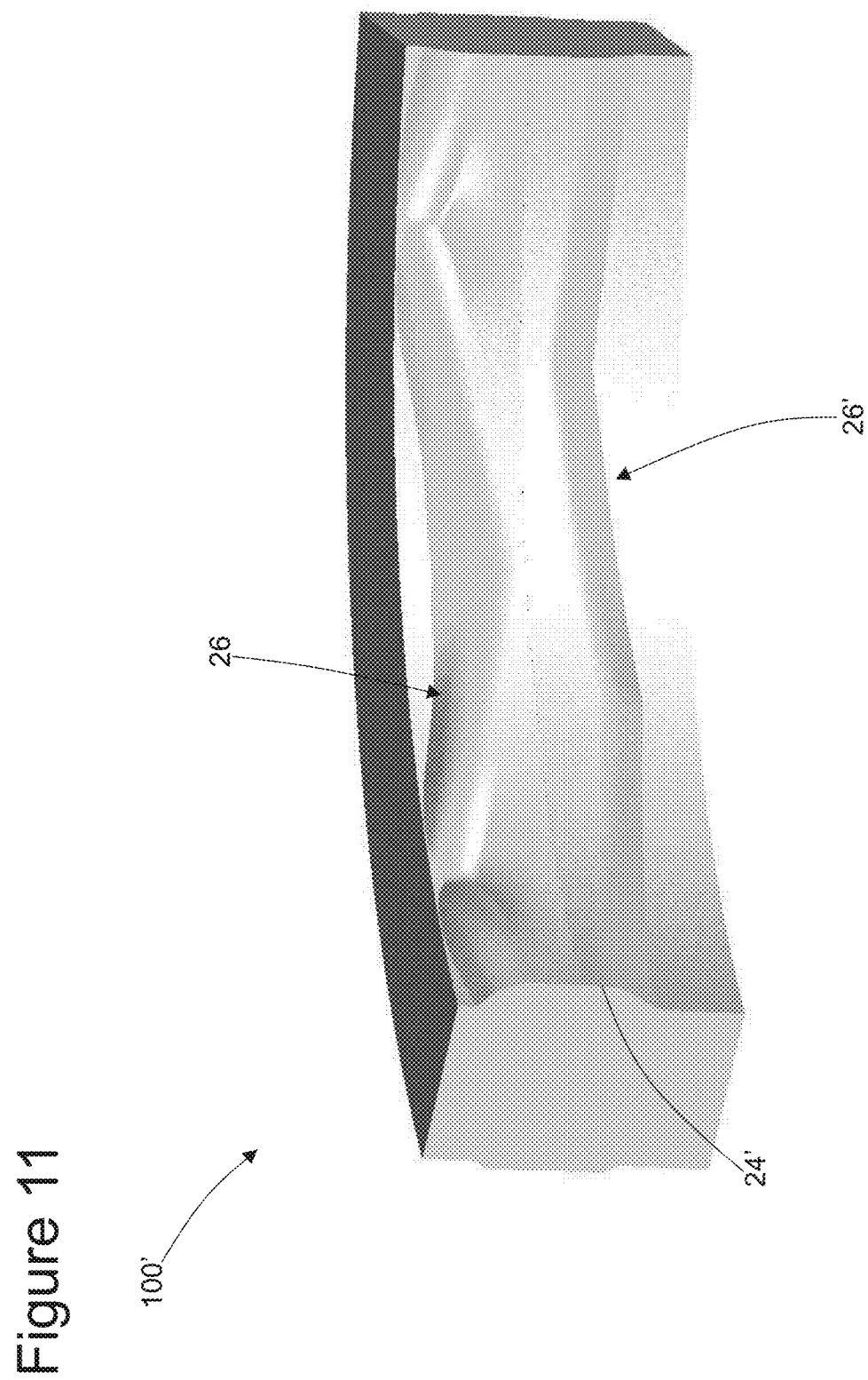
FIG. 11 is an enlarged fragmentary shaded perspective view of another embodiment of the rotary seal having different types of hydrodynamic waves on the two sides of the seal.

FIG. 11 shows an enlarged fragmentary shaded perspective view of another embodiment of the rotary seal, generally referred to as 100'. Rotary seal 100' has one type of hydrodynamic waves 26 on one side of the seal 100' and a different type of hydrodynamic wave 26' on the other side of the seal 100'. FIG. 11 shows a "zig-zag" pattern of waves 26' on one side of the dynamic lip 124. The zig-zag waves 26' are less aggressive than the waves 26. It may be desirable to use such a seal 100' where the zig-zag waves 26' are exposed to a first fluid (e.g., a lubricant) and the other side of the seal 100' is exposed to a second fluid, for example the environment, and the more aggressive waves 26 act to prevent loss of the first fluid and return of the first fluid back to the dynamic sealing interface. It is to be understood that various other wave forms may be used on either side of the dynamic lip 24 and the invention is not limited to the waves 26, 26' shown and described.

NOMENCLATURE LIST loosest curvature L
tightest curvature T
axial width W
mold 2
cavity 4
core 6
extension forming surface 6*e*
lip forming surface 6*s*
collar 8
extension forming surface 8*e*
pilot surface 8*p*
end surface 8*w*
cap 10
extension forming surface 10*e*
pilot surface 10*p*
cap wall 10*w*
plastic liner 12
inner surface 12*i*
outer surface 12*o*
rim 12*r* elastomer 14
preform 15
molded part 16
demolding ring 18
body 20
body first end 20*f*
body second end 20*s*
static sealing surface 21
extensions 22
first extension 22*f*
second extension 22*s*
dynamic lip 24, 24'
first side 24*f*
second side 24*s*
dynamic sealing surface 25
hydrodynamic waves 26, 26'
clockwise wave 26CW
counter-clockwise wave 26CCW
multi-function edge 28
first edge end 28*f*
second edge end 28*s*
angled flanks 29
ramp section 30
mouth 31
mouth flank 32
mouth fillet 34
trailing edge low points 36
rotary seal 100, 100'
seal first end 120*f*
seal second end 120*s*
machine assembly 130
first machine component 130*f*
second machine component 130*s*
first fluid 132
second fluid 134
relatively rotatable surface 136
shaft 138

The foregoing disclosure and description of the invention are illustrative and explanatory thereof, and various changes in the size, shape and materials, as well as in the details of the illustrated construction, may be made without departing from the spirit of the invention. The present embodiments are, therefore, to be considered as merely illustrative and not restrictive, the scope of the invention being indicated by the claims rather than the foregoing description, and all changes which come within the meaning and range of equivalence of the claims are therefore intended to be embraced therein.

While the invention has been described in detail above with reference to specific embodiments, it will be understood that modifications and alterations in the embodiments disclosed may be made by those practiced in the art without departing from the spirit and scope of the invention. All such modifications and alterations are intended to be covered. In addition, all publications cited herein are indicative of the level of skill in the art and are hereby incorporated by reference in their entirety as if each had been individually incorporated by reference and fully set forth.

We claim:

1. A hydrodynamic rotary seal (100) for bi-directional rotation and pressure, the rotary seal being generally ring-shaped and comprising:
    a seal first end (120*f*) and a seal second end (120*s*) facing in generally opposite directions;
    a dynamic lip (24) projecting radially inward and having a first side (24*f*) and a second side (24*s*), the dynamic lip defining a plurality of hydrodynamic waves (26) on the first side and a plurality of hydrodynamic waves (26) on the second side, the dynamic lip defining a dynamic sealing surface (25) of annular form facing in a radially inward direction and located in intermediate relation to the seal first end and the seal second end, the dynamic sealing surface being the most radially inward surface of the dynamic lip;
    each of the plurality of hydrodynamic waves on the first side of the dynamic lip having a wave geometry between a wave first end and a wave second end, the wave geometry comprising a mouth (31) at the wave first end at the seal first end, the mouth having a portion recessed relative to the dynamic sealing surface and having a portion blending into the dynamic sealing surface, the wave geometry further comprising a multi-function edge (28) extending in a generally circumferential direction and located in intermediate relation to the dynamic sealing surface and the seal first end, the multi-function edge being skewed relative to the seal first end and being farthest from the seal first end at the wave second end and defining a trailing edge low point (36); and
    each of the plurality of hydrodynamic waves on the second side of the dynamic lip having a wave geometry between a wave first end and a wave second end, the wave geometry comprising a mouth (31) at the wave first end at the seal second end, the mouth having a portion recessed relative to the dynamic sealing surface and having a portion blending into the dynamic sealing surface, the wave geometry further comprising a multi-function edge (28) extending in a generally circumferential direction and located in intermediate relation to the dynamic sealing surface and the seal second end, the multi-function edge being skewed relative to the seal second end and being farthest from the seal second end at the wave second end and defining a trailing edge low point (36);
    wherein the trailing edge low point on the first side of the dynamic lip is circumferentially spaced from the trailing edge low point on the second side of the dynamic lip.

2. The hydrodynamic rotary seal of claim 1, wherein the first side (24*f*) of the dynamic lip (24) includes at least one clockwise hydrodynamic wave (26CW) and at least one counter-clockwise hydrodynamic wave (26CCW) and the second side (24*s*) of the dynamic lip (24) includes at least one clockwise hydrodynamic wave (26CW) and at least one counter-clockwise hydrodynamic wave (26CCW).

3. The hydrodynamic rotary seal of claim 2, wherein the at least one counter-clockwise hydrodynamic wave (26CCW) on the first side (24*f*) is a mirror image of the at least one clockwise hydrodynamic wave (26CW) on the first side, and the at least one counter-clockwise hydrodynamic wave on the second side (24*s*) is a mirror image of the at least one clockwise hydrodynamic wave on the second side.

4. The hydrodynamic rotary seal of claim 1, wherein the hydrodynamic waves (26) on the second side (24*s*) are the same as the hydrodynamic waves (26) on the first side (24*f*).

5. The hydrodynamic rotary seal of claim 1, further comprising a plastic liner (12) forming at least part of the dynamic sealing surface (25).

6. The hydrodynamic rotary seal of claim 1, further comprising a plastic liner (12) forming all of the dynamic sealing surface (25).

7. The hydrodynamic rotary seal of claim 1, wherein the mouth (31) of each of the hydrodynamic waves includes a mouth flank (32) adjoining the dynamic sealing surface (25), at least a portion of the mouth flank being generally convex when viewed in longitudinal cross-section, the mouth flank having a curvature that varies, the mouth flank curvature being the tightest (T) at the wave first end and being the loosest (L) in the circumferential direction towards the wave second end where the mouth flank merges into the dynamic sealing surface, wherein the hydrodynamic waves on the first side (24*f*) of the dynamic lip are circumferentially spaced from the hydrodynamic waves on the second side (24*s*) of the dynamic lip (24) such that the locations of the mouth flank tightest curvature (T) locations on one side of the dynamic lip are circumferentially between the mouth flank loosest curvature (L) locations and the trailing edge low points (36) on the second side of the dynamic lip (24).

8. The hydrodynamic rotary seal of claim 7, wherein the first side (24*f*) of the dynamic lip (24) includes at least one clockwise hydrodynamic wave (26CW) and at least one counter-clockwise hydrodynamic wave (26CCW) that is a mirror image of the at least one clockwise hydrodynamic wave (26CW);

wherein the mouths (31) of adjacent clockwise and counter-clockwise hydrodynamic waves (26) on the first side of the dynamic lip (24) meet at the location where the curvature of each mouth flank (32) is tightest.

9. The hydrodynamic rotary seal of claim 8, wherein the second edge end (28*s*) of multi-function edges (28) of adjacent clockwise and counter-clockwise hydrodynamic waves on the first side (24*f*) of the dynamic lip (24) meet at the trailing edge low point (36).

10. The hydrodynamic rotary seal of claim 1, wherein the trailing edge low point (36) on one side of the dynamic lip (24) aligns with the portion of the mouth (31) that is tangent with the dynamic sealing surface (25) on the other side of the dynamic lip.

11. The hydrodynamic rotary seal of claim 1, wherein each trailing edge low point (36) on one side of the dynamic lip (24) is offset from the mouth (31) of the wave (26) on the other side of the dynamic lip (24) to maximize sealing width (W).

12. A hydrodynamic rotary seal (100) for bi-directional rotation and pressure, the rotary seal being generally ring-shaped and comprising:

a seal first end (120*f*) and a seal second end (120*s*) facing in generally opposite directions;

a dynamic lip (24) projecting radially inward and having a first side (24*f*) and a second side (24*s*), the dynamic lip defining a plurality of hydrodynamic waves (26) on the first side and a plurality of hydrodynamic waves (26) on the second side, the dynamic lip defining a dynamic sealing surface (25) of annular form facing in a radially inward direction, the dynamic sealing surface being the most radially inward surface of the dynamic lip;

at least some of the plurality of hydrodynamic waves on the first side of the dynamic lip having a wave geometry between a wave first end and a wave second end, the wave geometry comprising a mouth (31) at the wave first end at the seal first end, the mouth having a portion recessed relative to the dynamic sealing surface and having a portion blending into the dynamic sealing surface, the wave geometry further comprising a multi-function edge (28) extending in a generally circumferential direction and located in intermediate relation to the dynamic sealing surface and the seal first end, the multi-function edge being skewed relative to the seal first end and being farthest from the seal first end at the wave second end and defining a trailing edge low point (36); and at least some of the plurality of hydrodynamic waves on the second side of the dynamic lip having a wave geometry between a wave first end and a wave second end, the wave geometry comprising a mouth (31) at the wave first end at the seal second end, the mouth having a portion recessed relative to the dynamic sealing surface and having a portion blending into the dynamic sealing surface, the wave geometry further comprising a multi-function edge (28) extending in a generally circumferential direction and located in intermediate relation to the dynamic sealing surface and the seal second end, the multi-function edge being skewed relative to the seal second end and being farthest from the seal second end at the wave second end and defining a trailing edge low point (36);

wherein the trailing edge low point on the first side of the dynamic lip is circumferentially spaced from the trailing edge low point on the second side of the dynamic lip.

13. The hydrodynamic rotary seal of claim 12, wherein the first side (24*f*) of the dynamic lip (24) includes at least one clockwise hydrodynamic wave (26CW) and at least one counter-clockwise hydrodynamic wave (26CCW) and the second side (24*s*) of the dynamic lip (24) includes at least one clockwise hydrodynamic wave (26CW) and at least one counter-clockwise hydrodynamic wave (26CCW).

14. The hydrodynamic rotary seal of claim 13, wherein the at least one counter-clockwise hydrodynamic wave (26CCW) on the first side (24*f*) is a mirror image of the at least one clockwise hydrodynamic wave (26CW) on the first side, and the at least one counter-clockwise hydrodynamic wave on the second side (24*s*) is a mirror image of the at least one clockwise hydrodynamic wave on the second side.

15. The hydrodynamic rotary seal of claim 12, wherein the hydrodynamic waves (26) on the second side (24*s*) are the same as the hydrodynamic waves (26) on the first side (24*f*).

16. The hydrodynamic rotary seal of claim 12, further comprising a plastic liner (12) forming at least part of the dynamic sealing surface (25).

17. The hydrodynamic rotary seal of claim 12, wherein the mouth (31) of each of the hydrodynamic waves includes a mouth flank (32) adjoining the dynamic sealing surface (25), at least a portion of the mouth flank being generally convex when viewed in longitudinal cross-section, the mouth flank having a curvature that varies, the mouth flank curvature being the tightest (T) at the wave first end and being the loosest (L) in the circumferential direction towards the wave second end where the mouth flank merges into the dynamic sealing surface, wherein the hydrodynamic waves on the first side (24*f*) of the dynamic lip are circumferentially spaced from the hydrodynamic waves on the second side (24*s*) of the dynamic lip (24) such that the locations of the mouth flank tightest curvature (T) locations on one side of the dynamic lip are circumferentially between the mouth flank loosest curvature (L) locations and the trailing edge low points (36) on the second side of the dynamic lip (24).

18. The hydrodynamic rotary seal of claim 17, wherein the first side (24*f*) of the dynamic lip (24) includes at least one clockwise hydrodynamic wave (26CW) and at least one counter-clockwise hydrodynamic wave (26CCW) that is a mirror image of the at least one clockwise hydrodynamic wave (26CW);

wherein the mouths (31) of adjacent clockwise and counter-clockwise hydrodynamic waves (26) on the first side of the dynamic lip (24) meet at the location where the curvature of each mouth flank (32) is tightest.

19. The hydrodynamic rotary seal of claim 18, wherein the second edge end (28s) of multi-function edges (28) of adjacent clockwise and counter-clockwise hydrodynamic waves on the first side (24f) of the dynamic lip (24) meet at the trailing edge low point (36).

20. The hydrodynamic rotary seal of claim 12, wherein the trailing edge low point (36) on one side of the dynamic lip (24) aligns with the portion of the mouth (31) that is tangent with the dynamic sealing surface (25) on the other side of the dynamic lip.

21. The hydrodynamic rotary seal of claim 12, wherein each trailing edge low point (36) on one side of the dynamic lip (24) is offset from the mouth (31) of the wave (26) on the other side of the dynamic lip (24) to maximize sealing width (W).

\* \* \* \* \*